July 4, 1933.   C. T. PFLUEGER   1,916,582
FISHING TACKLE
Filed Oct. 3, 1929
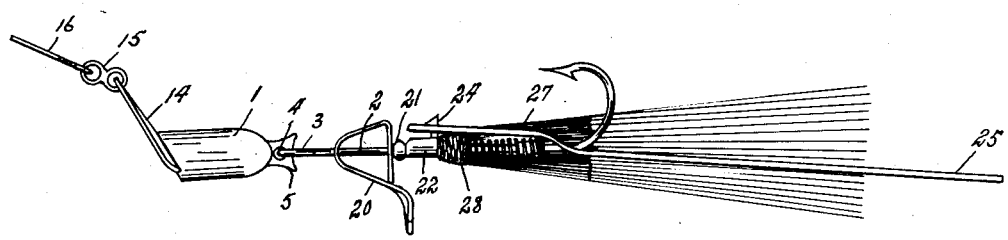
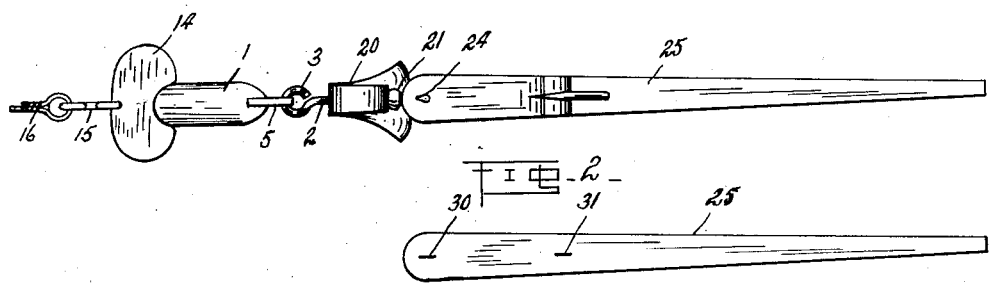
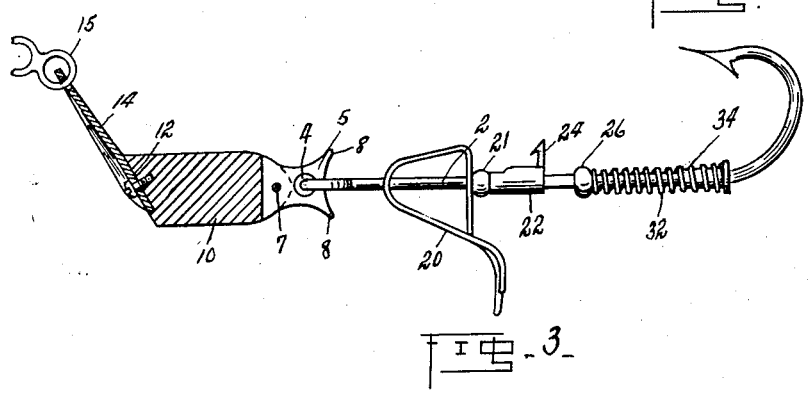
INVENTOR
CHARLES T. PFLUEGER.
BY
Ely + Barrow
ATTORNEYS.

Patented July 4, 1933

1,916,582

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

FISHING TACKLE

Application filed October 3, 1929. Serial No. 397,110.

The present invention relates to the manufacture of lures or baits such as used in casting or trolling.

The object of the invention is to design and construct a new and improved form of fishing bait or fishing tackle which will have marked advantages over previous forms of fishing tackle, as will be explained in the detailed description hereof. The improved bait or lure is designed to cast easily and accurately, and to take a zig-zag or undulatory path below the surface while being drawn through the water, so as to simulate the swimming of a fish. The bait is so constructed and designed that it will move through the water a short distance below the surface and will ride with the hook uppermost at all times.

The invention is particularly adapted and intended for use in combination with a pork rind or similar strip of flexible bait material, which in combination with the remainder of the bait structure, makes a very effective lure. In conjunction with the bait there is provided means for attaching the pork rind in such manner that it will be held under tension between two points of attachment on the hook. This improved method of securing the pork rind in position prevents the rind from becoming detached accidentally and from curling or bending upon the hook, and tends to maintain the rear or trailing portion of the rind in its proper position rearwardly of the hook at all times.

The invention also provides means for keeping the hook in its proper position, although permitting certain looseness or freedom of action between the main portion of the bait and the hook and its attached parts.

There are other objects and advantages of the invention which will be fully brought out in the description and claims, it being understood that the principles of the invention may be embodied in other forms than that shown, and the claims are not to be limited to exact conformity with the detailed description and showing of the invention.

In the drawing in which the preferred form of the invention is illustrated in detail;

Figure 1 is a side elevation of the complete bait or lure a portion of the bucktail or similar attachment having been removed to disclose the manner in which the pork rind is secured upon the hook;

Figure 2 is a plan view with the bucktail removed;

Figure 3 is a section taken along the shaft of the hook;

Figure 4 is a detail view of the pork rind or similar flexible strip of bait.

The bait comprises two parts or elements, a sinker or heavy plug indicated in general by the numeral 1, and a main hook and its attached parts indicated in general by the numeral 2. The sinker and the hook are jointed so as to permit of the requisite flexibility between these parts by passing the eye of the hook through a hole 4 in a web or fin 5 at one end of the sinker. The fin 5 consists of a flat plate set into the end of the sinker in a vertical plane and secured by a pin 7. It is formed with two oppositely extending horns or extensions 8.

While this construction permits a considerable degree of flexibility between the hook and the plug, the extensions 8 limit the arc of vertical movement of the hook with respect to the sinker so that the hook cannot become entangled with the line, nor can it become cocked or tilted to such an extent that it will fail to straighten out in the water. In this way the hook will be certain always to trail behind the sinker and maintain its flexible or jointed relationship therewith.

The plug 1 comprises the heavy body 10 which is shaped somewhat like a rifle bullet, the main portion being cylindrical and the rear end tapering toward the rear. The forward end of the sinker is cut away upon a forwardly and upwardly inclined plane surface in which is provided the recess 12, in which is set the substantially circular member 14. This member is secured in the recess against the forward end of the sinker and extends above the sinker body. It is slightly concaved or dished and provides an elevating surface which, as the bait is drawn through the water, tends to elevate the sinker. In the upper edge of the elevating member is located the double eye 15 to which the line 16 is attached.

It will be observed at this point that the tendency of the plug to sink in the water is resisted by the elevating force of the member 14, and the combination of these two forces causes the bait body to travel through the water in a horizontal path below the surface. It also causes the sinker to wiggle or travel in an undulatory path, and the movement of the body is transmitted to the trailing hook, so that the motion of the whole bait assembly is quite life-like. The sinker and member 14 are finished in a bright, reflecting surface so that the light is caught and reflected thereby.

Journaled upon the shaft of the hook is the freely rotatable spinner or spoon indicated by the numeral 20, a bead 21 being located rearwardly thereof. The rotation of the spinner upon the hook tends to affect the movement of the entire bait structure and adds to the attraction of the bait.

Fixed upon the shank of the hook rearwardly of the spinner is a sleeve 22, on the upper side of which is formed a small bait hook or prong 24 for the reception of the forward end of the flexible bait strip or pork rind 25.

Beyond the sleeve 22 on the hook shank is secured the bead 26 between which bead and the sleeve 22 the lure, such as bucktail, feathers or the like 27, is attached by the usual binding 28. The lure 27 surrounds the rear of the hook and conceals the end thereof and the attachment for the pork rind.

In the ordinary method of attaching pork rinds to hooks, the upper end is held upon a hook or prong similar to the prong 24, and the central part thereof is received over the curved portion of the hook. The pork rind is fastened in such a manner that it will not remain in the correct position, but will curl or buckle up on the hook, and this may cause the rind to become entangled in the hook or with the spinner. If the rind does not keep its correct position it will interfere with the action of the bait, and will be objectionable for that reason.

One of the objects of the present invention is to provide an improved means for attaching the rind so that it will be held upon the hook under tension between its points of attachment. This will cause the rind to lie along the shank of the hook, and the end of the rind will trail out properly behind the hook.

The pork rind or other flexible strip which may be substituted for it, is usually furnished with two holes or slits therein, indicated in Figure 4 at 30 and 31, the hole 30 being received over the small bait hook 24, and the hole 31 over the shank of the hook. These holes are located at the proper distance apart to secure the requisite tension upon the forward part of the rind, as will be explained.

The device for holding the strip under tension comprises an expansible element which is adapted to be compressed by the attachment of the strip so as to hold that portion of the rind between the holes 30 and 31 taut and lying along the shank of the hook. In the form shown, this consists of a loose coil spring 32 which surrounds the hook, the forward end of the spring bearing against the bead 26 and the rear end of the spring contacting a loose sleeve 34. The sleeve 34 snugly fits the shank of the hook and accordingly the curve of the hook acts as a stop to prevent the sleeve and spring from riding around the bend of the hook. In its normal position, the distance between the bait hook 24 and the sleeve 34 is somewhat longer than the distance between the holes 30 and 31.

In attaching the rind, the hole 31 is first passed over the end of the hook and the strip brought around the hook and pressed up the shank until the hole 30 is over the bait hook, at which point the spring 32 is compressed. After the hole 30 is passed over the bait hook, the spring is maintained under compression and this stretches and keeps taut the upper portion of the strip so that it will lie along the hook as shown in Figure 1, and the end of the strip trails out behind the hook. The arrangement which has been described maintains the strip of bait material in its proper condition so as to secure the desired results.

So far as known to me, the invention is the first to utilize an expansive force upon a pork rind or other flexible strip of material to keep it taut at the region where it is attached to the hook. The superior results obtained with this arrangement have not been secured with previous methods of attachment. The device is simple and very effective for the purposes.

The other advantages of the improved form of fishing tackle have been thoroughly brought out in the specification and the claims are intended to be broad enough to cover modifications or improvements within the scope of the invention. The combination of the weighted sinker, the inclined plane, and the improved pork rind attachment constitutes a very effective lure or bait.

What is claimed is:

1. In an artificial bait, a sinker at the forward end thereof, the forward end of the sinker being formed with an upwardly and forwardly inclined surface, an elevating member attached to the surface, a hook jointedly connected to the sinker for relative angular movement both vertically and horizontally, and means to limit the vertical angular movement of the hook with respect to the sinker.

2. In an artificial bait, a sinker at the forward end thereof, the forward end of the sinker being formed with an upwardly and forwardly inclined surface, an elevating member attached to the surface, a vertical plate extending from the rear end of the sinker, and a hook having the eye thereof located in the plate.

3. In an artificial bait, a sinker at the forward end thereof, an elevating member attached to the sinker, a hook having a loose connection with the sinker to permit relative movement in both horizontal and vertical planes, and means to limit the angular movement of the hook in a vertical plane only.

4. In an artificial bait, a sinker at the forward end thereof, an elevating member attached to the sinker, a hook having a loose connection with the sinker, and means to maintain the hook upright in the water and to limit the vertical angular movement only of the hook.

5. In combination with a sinker body, a hook pivotally connected at the rear of the body, a strip of flexible bait material carried upon the hook by two points of attachment, and an expansible element between the points of attachment normally held under compression by the bait material and operable to exert tension upon the strip.

6. In combination with a sinker body, an elevating member on the forward end of the sinker body, a hook pivotally connected at the rear of the body, a strip of flexible bait material carried upon the hook by two points of attachment, and an expansible element between the points of attachment and operable to exert tension upon the strip.

7. In fishing tackle, the combination with a main hook, a bait holder on the shank thereof, a spring below the bait holder, and a strip of flexible bait material attached to the bait holder and passing over the shank of the hook, the bait material maintaining the spring under compression.

8. In fishing tackle, a hook and a strip of flexible bait material attached to the hook at two separate points, and an expansible element located between the said points and held in contracted condition by the bait material to hold the strip under tension.

9. In fishing tackle, a hook and a strip of flexible bait material attached to the hook at two separate points and having a trailing end beyond the hook, and an expansible element located between the said points and compressed by the bait material to hold the strip under tension.

10. In fishing tackle, a hook and a strip of flexible bait material attached to the hook at two separate points and having a trailing end beyond the hook, an expansible element located between the said points and held under compression by the strip to hold the strip under tension, and a spinner upon the hook.

11. In fishing tackle, a hook, a strip of flexible bait material attached to the hook at two separate points thereon, and a coiled compression spring mounted upon the shank of the hook to tension the strip between said points of attachment.

12. In fishing tackle, a hook, a strip of flexible bait material attached to the hook at two separate points thereon, one of said points being fixed and the other point being movable lengthwise of the hook, and an expansible member on the shank of the hook between said points of support to urge the movable point of support lengthwise of the hook to tension the bait material between said points.

13. In combination with a body heavier than water, a hook pivotally connected to the body, a strip of flexible bait material fixedly attached at one end to the hook, and an expansible element engaging the bait material at an intermediate point thereof for exerting tension on said strip between said point and said point of attachment, said element being held under compression by the bait material.

14. In combination with a body heavier than water, a hook pivotally connected to the body, a strip of flexible bait material fixedly attached at one of its ends to the hook, and yielding means carried by the hook and movable longitudinally along the shank thereof engaging the bait material at an intermediate point thereof for applying tension to said strip between said point and its point of fixed attachment to the hook.

CHARLES T. PFLUEGER.